Feb. 5, 1935.    A. J. FARMER    1,989,744
LUBRICATING SYSTEM
Filed Feb. 12, 1926    2 Sheets-Sheet 1
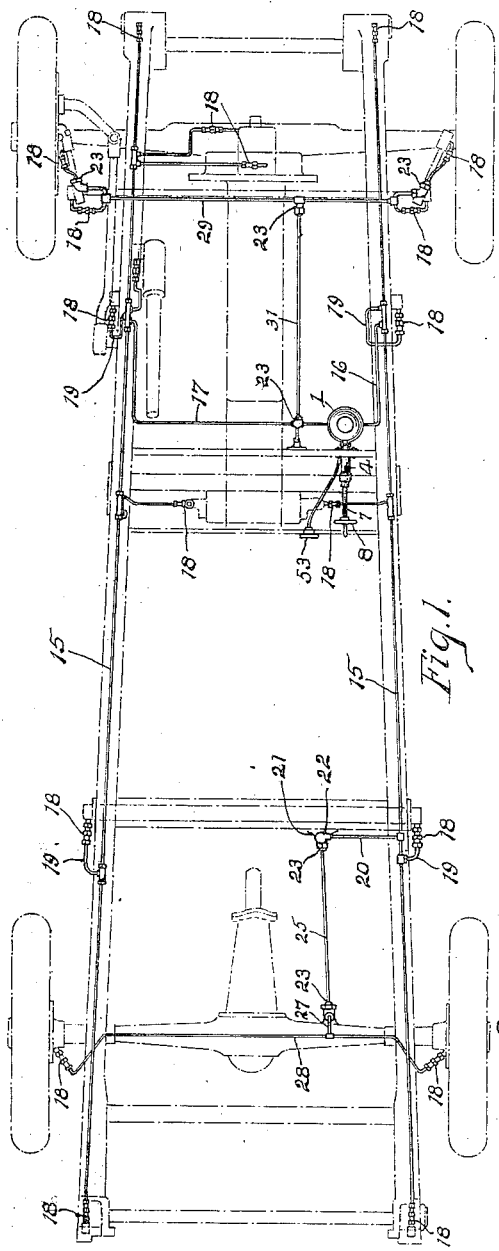
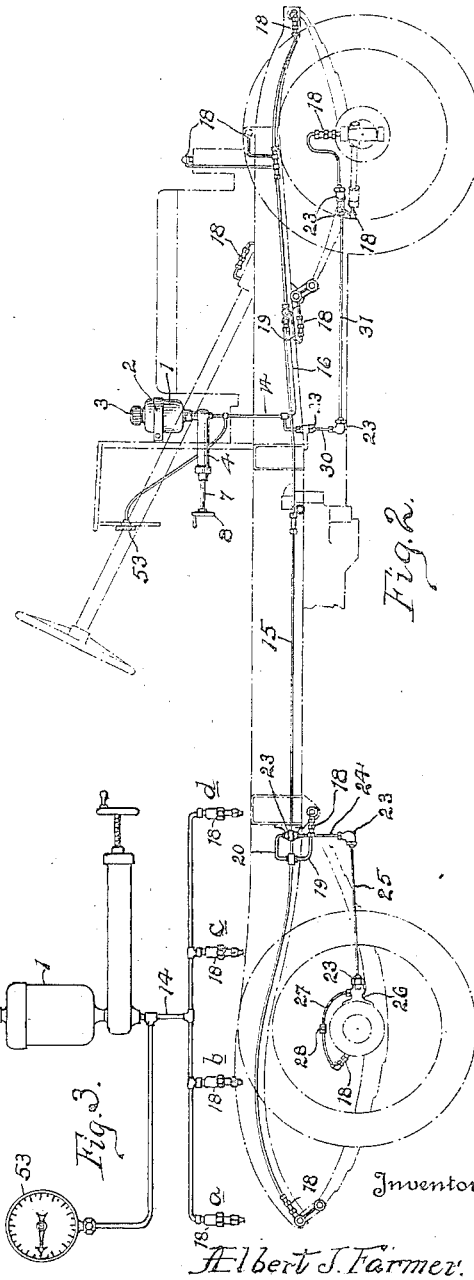
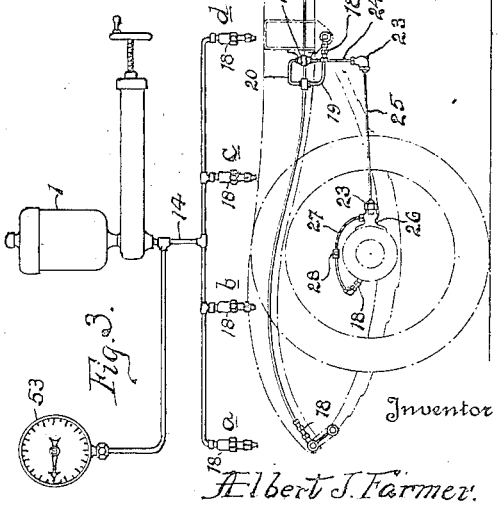
Inventor
Albert J. Farmer.
By
Attorney

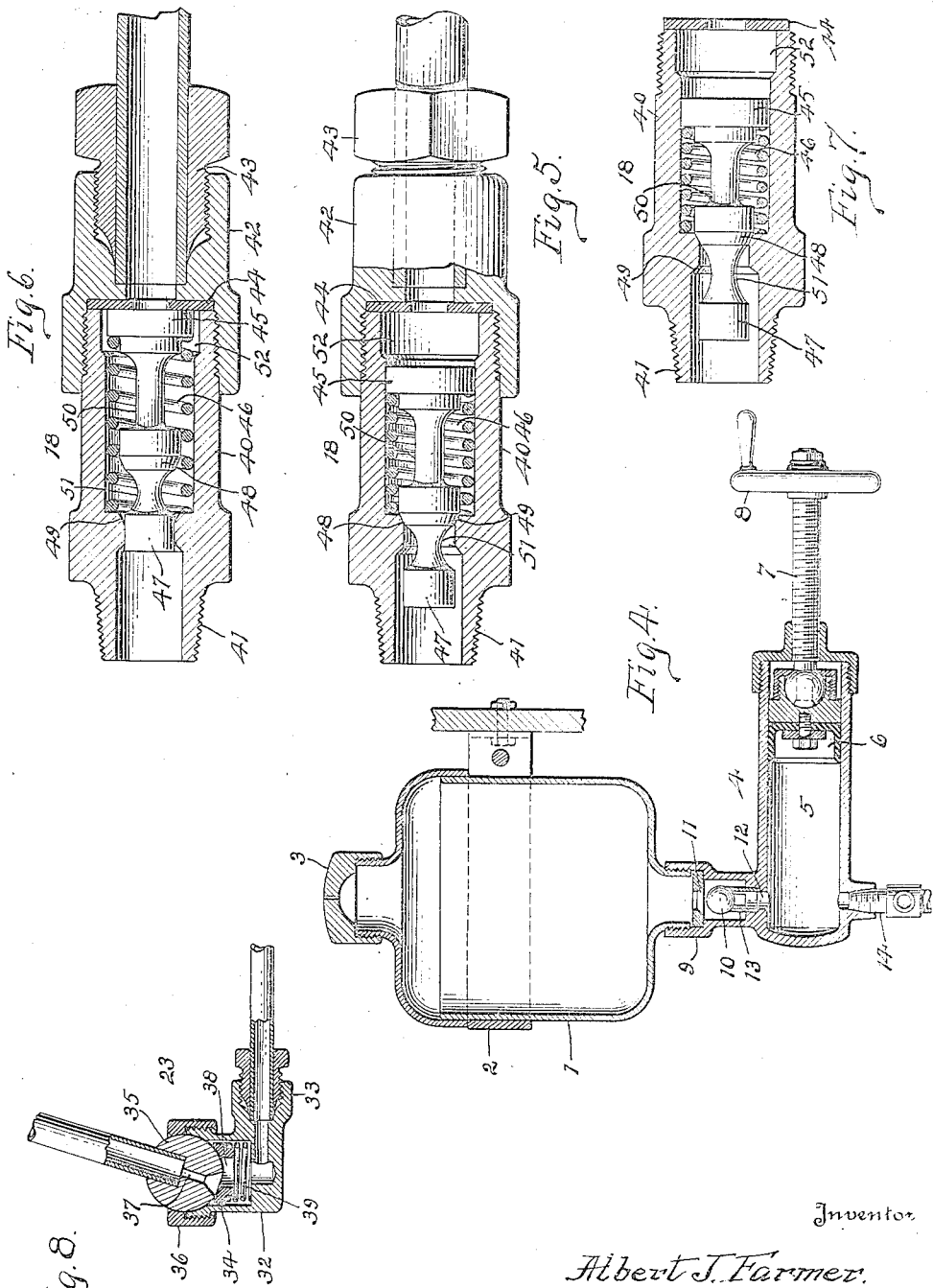

Patented Feb. 5, 1935

1,989,744

UNITED STATES PATENT OFFICE 1,989,744

LUBRICATING SYSTEM

Albert J. Farmer, Detroit, Mich., assignor, by mesne assignments, to The Farval Corporation, Cleveland, Ohio, a corporation of Ohio Application February 12, 1926, Serial No. 87,760

7 Claims. (Cl. 184—7)

Lubricating systems for lubricating the several parts of motor vehicles from a central or single source of lubricant supplied, as usually constructed and arranged are not positive in their operation, that is, one bearing or part may receive an over-supply of lubricant while another receives little or none, and should one or more of the parts or bearings or conduits leading thereto become clogged, there is no provision made for forcing lubricant to that particular bearing or part or through such conduit for the purpose of removing such obstruction. Further, in the operation of such systems, there is nothing to indicate to the operator the presence of such obstruction or to indicate whether or not each part or bearing is receiving proper lubrication, and excessive pressure applied to force the lubricant through the system, will cause the lubricant to flow through the path of least resistance and simply flow through that particular bearing or part without applying pressure where needed and giving excess of lubrication to the bearing or part which offers the least resistance to its passage.

For this reason no provision is made for forcing lubricant through the system under pressures sufficient to remove obstructions and it is therefore necessary, when clogging occurs, to go over the entire system in order to locate the trouble and to then disconnect the parts in order to remove the obstruction. The use of heavy oil or other lubricant which is only partially fluid, is also prohibited because of this lack of sufficient pressure to force it through the system and into the bearings.

It is also the usual practice, to mount the main conduit or conduits on the chassis frame and conduct lubricant from such conduit by a flexible connection, such as a coiled pipe or other flexible unit, to parts which move relative to the frame, but such flexible connections are liable to breakage under constant flexure and are subject to frequent replacement.

An object of the present invention as embodied in the system and described hereinafter, is to permit forcing of lubricant through the system at pressures sufficient to remove obstructions, the arrangement being such as to apply such pressure where required without flooding other parts or bearings, and to provide simple and conveniently operable means connected to the system for creating such high pressures. It is also an object to secure, in such a system, the feeding of predetermined quantities of lubricant to each bearing or part with certainty, regardless of extremes, to which the pressure may be raised, and indicate to the operator during the creating of such pressure, the operation of all parts of the system or the clogging of any part thereof and the removal of such obstruction by such pressure. A further object is to provide for the use of a non-freely flowing or heavy lubricant, and for accuracy, efficiency, and certainty in the lubrication of every part connected within the system.

A further object is to secure dependability and long life in the installed system by including therein, connections between the relatively movable parts therein, which connections are such to to reduce wear and breakage to the minimum, and also to provide certain other new and useful features in the construction and arrangement of parts of the system, all as hereinafter more fully described.

With the above and other ends in view, the invention consists in including in such a system, means adjacent each part to be lubricated, a device operative to deliver a predetermined quantity of lubricant, and after such delivery, to positively stop further delivery until the device is again operated by a reduction in pressure, and to include in the system pressure producing means operative to increase pressure on the lubricant in the system to a point far in excess of that required to operate the delivery controlling device therein.

The invention further consists in including in such a system, visible means directly affected by pressure applied to lubricant in the system whereby the operation or non-operation of the several delivery controlling devices is indicated.

The invention also consists in the construction of the delivery controlling device, a pressure device, and conduit connections, whereby such instrumentalities form a part of the present system, and to provide certain other new and useful features, all as hereinafter more fully described and more particularly pointed out in the appended claims, reference being had to the accompanying drawings, in which Figure 1 is a plan view of a system illustrative of the present invention and showing the same as applied to a motor vehicle chassis;

Fig. 2 is a side elevation of Fig. 1;

Fig. 3 is a diagrammatic view shown for the purpose of illustrating the operation of the system;

Fig. 4 is a sectional detail showing a pressure producing device for forcing lubricant through the system and also showing a lubricant supply receptacle cooperating therewith to supply lubricant to the pressure device;

Fig. 5 is a detail of a device for controlling the supply of lubricant to each of the several parts or bearings to be lubricated, said device being shown in partial longitudinal section;

Fig. 6 is a detail similar to that of Fig. 5, and showing the delivery control plunger of the device in a different position of its operation from that shown in Fig. 5;

Fig. 7 is a further sectional detail of a lubricant controlling delivery device in the slightly modified form, and Fig. 8 is a sectional detail of a universal conduit joint connection.

For the purpose of illustration, a system embodying the present invention is shown as applied to an automobile chassis for supplying lubricant to the several bearings thereof, but it will be understood that the present system may be applied as well to other machines or device having bearings and parts to be lubricated, and which parts may be relatively movable.

In the drawings 1 indicates a lubricant receptacle which may be supported in any convenient manner, as by a strap 2 from any suitable support, such as the cowl board of a motor vehicle, and this receptacle has a removable cap 3 which may be removed in order to fill the receptacle with a supply of lubricant. Adjacent this receptacle and preferably beneath the same, is positioned a pressure device or pump which is indicated as a whole by the numeral 4, said device comprising a cylinder 5 having a piston 6 therein which is operated by means of a screw-threaded stem 7 passing through a removable cap on the end of the cylinder. This stem is operated by means of a hand wheel 8 and when the system is applied to a motor vehicle, as illustrated in Figs. 1 and 2, the cylinder of the pump will extend through an opening in the cowl board to bring the hand wheel into a convenient position for operation by the driver of the vehicle. The cylinder of the pump is in communication with the lower end of the receptacle 1 by means of a connection 9 and in this connection is positioned a ball check valve 10 arranged to seat upwardly against a seat 11 and prevent lubricant from being forced from the pump upwardly into the receptacle when the pump plunger is operated. This ball 10 is supported within the connection 9 above the outlet passage 12 which opens into the cylinder 5, by a suitable cage 13 upon which the ball seats downwardly when the piston 6 is retracted to draw lubricant from the receptacle into the cylinder, said cage being provided with openings to give free passage of lubricant past the ball. A pipe or conduit 14 is connected to the cylinder 5 opposite the inlet 12 so that upon forward movement of the plunger 6 the lubricant contained in the cylinder will be forced out into the conduit 14 which forms a part of the system of piping leading to the several parts or bearings to be lubricated.

When the system is applied to a motor vehicle chassis as illustrated, a main pipe line or conduit is installed within each longitudinal side frame member of the chassis, said main conduits 15 extending from end to end of the frame with suitable leads 16 and 17 extending laterally of the frame from the conduit 14 and connected into the two main conduits 15 to supply lubricant thereto. At the extreme ends of the main conduits 15 suitable lubricant controlling devices, each indicated as a whole by the numeral 18, are connected to the ends of the conduits at one end and to the spring bearing at their opposite ends to control the supply of lubricant to said bearings. The bearings for the opposite or inner ends of the springs which support the chassis frame, are supplied with lubricant from the main conduits 15 through branches 19 leading from said conduits and in which branches lubricant supply controlling devices 18 similar to those at the ends of the frame are connected. In order to supply lubricant to the wheel bearings of the rear axle from one of the main conduits 15, it is necessary to provide for universal movement of the connection between the conduit carried by the frame and the conduit carried by the axle, as the axle and frame are relatively movable due to the support of the frame upon the axle by means of the usual spring support. As illustrated, this connection comprises a branch 20 leading from one of the main conduits 15 laterally to a suitable bracket 21 secured to a cross member in the frame forwardly of the rear axle, this branch leading into a suitable fitting 22 carried by the bracket and a fitting forming a universal joint connection also carried by the bracket, which universal connection is indicated as a whole by the numeral 23. A branch 24 depends from this universal connection and is provided at its lower end with a similar universal connection, shown in detail in Fig. 8. A pipe 25 leads from this latter connection 23 to a similar connection supported by a bracket 26 on the rear axle and from the connection on the bracket a branch pipe 27 leads to a connection with a pipe 28 extending longitudinally of the axle and supported thereby. This pipe 28 is provided at its ends with lubricant controlling devices 18 to control the supply of lubricant to the bearings of the rear wheels. Because of the universal joint connection in the conduit connection between the main conduit and the conduit carried by the rear axle, the frame and axle may move relatively without putting a strain upon this connection and a supply of lubricant under pressure is therefore insured for the rear axle bearings at all times.

A connection between the main conduits and a conduit 29 which extends longitudinally of the reach rod at the forward end of the vehicle, is constructed similarly to the connection just described and which connects the main conduit with the conduit supported by the rear axle. The conduit 29 is provided adjacent each bearing to be supplied with lubricant, with a controlling device 18 and full pressure of lubricant in the system is conducted to the conduit 29 through a depending branch 30 which is in communication with the pipe 17 and through universal fittings 23 at the ends of a forwardly extending pipe 31, said universal fittings providing for universal movement of this pipe so that the conduit 29 which is supported by the front axle may move freely relative to the frame upon which the main conduit is carried. The whole conduit system therefore comprises pipes and fittings and wherever a connection is to be made between pipes carried by relatively movable parts, universal fittings 23 are inserted in the pipe connections to permit of such relative movement and these universal fittings, as shown in Fig. 8, are particularly adapted for the purpose in that a universal connection is not only provided but the passage through this connection is always free and unobstructed for the free flow of lubricant therethrough.

Each of the universal connections which are indicated as a whole by the numeral 23, comprises a body 32 of desired shape having formed integral thereto a nipple 33 to which one end of an adjacent conduit or pipe is attached by a suitable compression connection to make a tight joint. The body 32 is formed with a chamber in which is positioned a plunger 34, this plunger being formed at its end with a seat for a ball 35 secured to the end of the other pipe or conduit of the two conduits which are to be connected together by this universal connection. The ball 35 is held seated in a seat in the upper end of the body 32 by means of a cap 36 and this ball is formed with a passage 37 which provides communication in the end of the pipe with the interior of the body 32, said plunger 34 being also formed with an axial opening 38 so that a free passage of lubricant is provided through the connection for the lubricant from one pipe to the other. A coiled spring 39 within the body 32 holds the plunger 34 yieldingly against the face of the ball 35 to make a tight joint therewith and prevent the escape of lubricant which is forced through the pipes under a high pressure. The nipple 33 may be extended laterally, as shown in Fig. 8, to provide a right angle or L-connection or it may extend in any other direction from the body to provide the desired connection for the pipe thereto.

The several controlling devices 18 which control the supply of lubricant to each of the several parts to be lubricated and which device is shown in detail in Figs. 5, 6, and 7, each comprises a body 40 forming a cylinder and having a screw-threaded nipple end 41 adapted to be secured into a screw-threaded bore adjacent the part to be lubricated to supply lubricant thereto. The opposite end of the body is provided with a sleeve 42 which is bored out to receive a suitable compression coupling 43 for connecting the supply pipe or conduit leading to each of these lubricant control devices. A washer 44 is interposed between the body and the member 42 and has a central opening in alignment with the pipe or conduit for the passage of lubricant therethrough, this washer forming a seat for a head 45 on one end of a plunger which is movable within the cylinder or bore of the body 40. This plunger is normally held with its head 45 in contact with the washer seat 44 by means of a coiled spring 46 interposed between the inner end of the bore of the cylinder and the head 45 and the discharge end of the cylinder is formed with a central bore or discharge opening to permit the passage of lubricant therefrom to the bearing or other part to be lubricated, said bore or passage being normally closed by a cylindrical end portion or plug 47 on the end of the plunger opposite that which is provided with the head 45. This cylindrical end 47 is of sufficient length to permit of a considerable movement of the plunger before this portion passes from the outlet of the cylinder and permits the escape of lubricant.

Intermediate the ends of the plunger, said plunger is formed with a tapering portion forming a valve 48 which is adapted to seat within a valve seat 49 formed at the inner end of the bore in which the plug 47 fits. The plunger is preferably reduced in diameter between the head 45 and the valve member 48, forming a neck portion 50 and providing an enlargement of the chamber of the cylinder, and between the valve member 48 and the end portion 47 of the plunger, said plunger is reduced to form a second neck portion 51 which also serves to enlarge the capacity of the cylinder.

The inlet is normally closed and when the system is first operated, the air must be dispelled therefrom and hence the lubricant entering the measuring devices first unseats head 45 to allow flow around the same through enlargement 52, compressing the air in the chamber until substantially line pressure is reached, after which the piston head 45 is moved until it enters the smaller portion of the cylinder after which further free flow around head 45 is cut off. Continued movement of head 45 further compresses the air in the cylinder and may allow flow past head 47 as the same must have a certain amount of clearance in its bore. When head 47 leaves its bore, the air under pressure forces the lubricant through the outlet and some air is also discharged from the chamber. This action occurs until member 48 seats upon seat 49, after which no further flow takes place.

On the return movement lubricant is by-passed past head 45 to the chamber, during which movement some more of the air and lubricant will be displaced through the outlet.

The device is operated until all of the air has been displaced.

After the air has been displaced, with the valve in the position of Fig. 6 when pressure is applied, head 45 will leave its seat and flow of lubricant can then occur from the chamber through the enlarged portion of the chamber to the front of the piston until head 45 enters the smaller portion of the bore or the lubricant can seep past head 47 during this period. When head 45 enters the smaller portion of the bore, further movement of the piston necessarily requires that lubricant leak past head 47 until the same leaves its bore, at which time free flow will take place until valve 48 comes to its seat, after which flow will be cut off. Upon relief of pressure at the inlet the spring returns the structure, displacing the lubricant from ahead of the piston to the chamber behind the same, a portion of the lubricant being also displaced to the outlet because of the fact that head 45 displaces more lubricant than can be taken by the chamber behind the head, because of the extension of the piston member. When valve 47 enters its bore, continued movement until the member reaches the position of Fig. 6 requires that flow occur past valve 47.

With this arrangement each part to be lubricated is supplied with a measured quantity of lubricant each time the pressure in the system is increased by the operation of the hand wheel 8 of the pump 4 and should any one of the bearings or parts be clogged so that a high resistance is offered to the forcing of lubricant into the bearing, the pressure in the conduits may be raised sufficiently to force out this obstruction from that particular bearing without flooding the other bearings which have just been supplied with a measured quantity of lubricant by the operation of their several controlling devices.

An indicator 53 preferably of the dial type and of any suitable construction is preferably connected into the main conduit 14 leading from the pump 4 so that the pressure in the conduits created by the operation of the pump will at all times be indicated by this indicator which, when the system is applied to a motor vehicle, is preferably placed upon the instrument board where it may be constantly observed by the operator.

A diagrammatic illustration of the system is shown in Fig. 3 for the purpose of disclosing the manner in which the system operates in use, and by referring to this diagram the arrangement of the indicator relative to the pump and the connection of the several lubricant controlling devices within the system will be understood.

As illustrated in Fig. 7, the construction of the controlling device may be modified to provide the discharge of a greater amount of lubricant than will be discharged by the device as shown in Figs. 5 and 6, and any desired measured quantity of lubricant according to the needs of the particular part to be lubricated may be secured by increasing or decreasing the length of the neck portion 51 of the plunger, thus providing a greater or lesser chamber or space between the plug 47 and the valve 48 to contain a greater or lesser charge.

Supposing that the several devices a, b, c, and d, shown in Fig. 3 are each connected to a different bearing and are each arranged to discharge a different measured quantity of lubricant at each operation, and supposing that the bearing to which the member d is connected has become clogged in some manner, the operator will create a pressure on the lubricant in the conduit by turning the handle 8 then forcing lubricant from the cylinder 5 into the line. As this pressure rises, such pressure will be indicated by the indicator 53 and when a sufficient pressure has been reached to operate the first controlling member a and said member has discharged its measured quantity into the gearing, as this quantity is discharged the pressure in the line will be normally reduced and the hand of the indicator will indicate by a quick movement that this discharge has taken place and that the bearing has received its lubricant. The other controlling members b, and c will operate in a similar manner in succession as the pressure is increased and the operation of each will be indicated by a quick movement of the hand of the indicator as the discharge take place. A continued operation of the pump will increase the pressure in the line which will be indicated on the indicator and as this pump is operated by a screw-threaded stem and hand wheel, a very high pressure may be secured in the line and as the control members a, b, and c have operated and their plungers have come to a positive seat, their bearings will not be flooded by further supply of lubricant no matter to what extent the pressure raised in the line may be, therefore this pressure may be raised to a point where it will be sufficient to force the obstruction from the bearing to which the member d is connected and as soon as the obstruction is removed the member d will quickly operate to feed its measured quantity of lubricant to the bearing and will then positively close. The relief of the pressure by the removal of the obstruction and the operation of the member d will be immediately indicated upon the indicator and the operator will know that the obstruction has been removed and the bearing properly lubricated. A continued operation of the pump will further increase the pressure in the line which will be indicated by a steady rise indicated upon the indicator and the operator will know by such steady rise that all of the bearings have received proper lubrication. Proper lubrication of each and every bearing is therefore insured and this without flooding any of the bearings and the operation of the entire system is at all times indicated so that the operator is sure that all of the bearings are being properly lubricated and that the system is working perfectly.

By placing the pump 4 directly beneath the supply chamber 1 a supply of lubricant is always in position to flow into the pump cylinder and completely fill the same, and the pressure of the pump is immediately applied to the conduit system by providing the check valve 10 which closes the entrance of the fluid in the cylinder from the supply chamber immediately upon any increase of pressure in the cylinder due to the operation of the pump piston.

In this arrangement of devices and their connection within a lubricating system, positive and accurate operation of the system is insured and the operator is at all times advised of its proper operation. This is more essential when such a system is applied to a motor vehicle construction as great injury may be done should one or more of the bearings fail to receive the proper amount of lubrication.

Obviously the system may be constructed and arranged in a manner other than that as shown in the drawings to suit the particular conditions and installations and it is contemplated that such a system may be used not only in connection with motor vehicle construction but also in connection with any machine having bearings which must be lubricated and parts which are relatively movable. Changes may therefore be made in the construction, as shown, and in the construction and several devices connected within the system, without departing from the spirit of the invention and I do not, therefore, wish to limit myself other than as specifically set forth in the accompanying claims.

Having thus fully described my invention, what I claim is:—

1. In a lubricating system, a device for controlling the supply of lubricant under pressure within the system to a part to be lubricated, said device comprising a body forming a cylinder with an inlet at one end and an outlet at its opposite end, and a spring pressed member in the cylinder operated by lubricant pressure and formed to close said inlet and substantially close said outlet at one end of its movement and to hold said outlet substantially closed during a portion of its movement, said member being also formed with a seating portion to positively close said outlet at the other end of the movement of said member, said member being also formed to open said outlet prior to the seating of said seating portion.

2. In a lubricating system, a device for controlling the supply of lubricant under pressure within the system to a part to be lubricated, said device comprising a body forming a cylinder with a discharge passage at one end of the cylinder and an inlet opening at the opposite end, and a plunger within said cylinder having a head at one end to close the inlet, said head being of a diameter slightly less than the major portion of the cylinder, an end portion of the cylinder adjacent the inlet being formed of substantially greater diameter than said head, said plunger being also formed with an end portion to move within the outlet passage and of slightly less diameter than said outlet passage and having a valve portion to close the outlet from the cylinder at the end of the movement of the plunger, said plunger being reduced in diameter intermediate said valve and head, and a spring within the cylinder to move the plunger and normally hold the inlet to the cylinder closed.

3. In a lubricating system as characterized in claim 2, and wherein said end portion of said plunger is cylindrical, said cylindrical portion being of a length to permit movement within the outlet passage and hold said passage substantially closed during such movement and to thereafter move from the outlet passage when the plunger is further moved to seat said valve, the portion of the plunger between said cylindrical portion and said valve being reduced in diameter to provide a chamber to contain measured quantities of lubricant to be discharged when the cylindrical portion opens the outlet passage by passing therefrom as the plunger is moved to seat said valve.

4. The combination with a part to be lubricated and a source of lubricant supply, of a valve including a normally closed lubricant measuring chamber, movable spring pressed means operable by the lubricant pressure and cooperative with the chamber walls to successively establish and cut off communication between said chamber and the source of lubricant supply during movement of the movable means in one direction, said means being also operable during the movement in such direction to successively establish and cut off communication between said chamber and the part to be lubricated, free flow between said inlet and chamber being prevented when free flow from said chamber to said outlet takes place.

5. The combination with a part to be lubricated and a source of lubricant supply, of a valve including a normally closed lubricant measuring chamber, movable spring pressed means operable by the lubricant pressure and cooperative with the chamber walls to successively establish and cut off communication between said chamber and the source of lubricant supply during movement of the movable means in one direction, said means being also operable during the movement in such direction to successively establish and cut off communication between said chamber and the part to be lubricated, the relative formation of chamber and means being such that the respective periods of communication are non-concurrent.

6. The combination with a part to be lubricated and a source of lubricant supply, of a valve including a normally closed lubricant measuring chamber, movable spring pressed means operable by the lubricant pressure, and cooperative with the chamber walls to successively establish and cut off communication between said chamber and the source of lubricant supply during movement of the movable means in one direction, said means being also operable during the movement in such direction to successively establish and cut off communication between said chamber and the part to be lubricated, the period of communication of the chamber with the supply being in advance of and non-concurrently with the period of communication between the chamber and the part to be lubricated.

7. In a metering valve structure for lubricating systems, a casing presenting a chamber having an inlet port and an elongated outlet port, with the inlet port connected with the lubricant supply and the outlet port connected with the point of lubrication, a spring supported plunger having a head normally closing the inlet port and having its opposite end located within and forming an elongated closure for said elongated port in such normal position, said plunger also having an intermediate portion constituting a valve inactive in such normal position of the plunger and rendered active with the inlet end of the elongated port to close the latter when the plunger is advanced from its normal position a distance sufficient to project the elongated closure a material distance beyond the outlet end of the elongated port, said chamber having an end zone adjacent the inlet of greater diameter than the head diameter and an intermediate portion of only slightly larger diameter than the head, the lengths of the end zone and elongated closure being such that upon advance movement of the plunger, communication is established between the inlet and intermediate portion through the end zone, and upon further movement communication is cut off between the inlet and intermediate portion except for slight leakage to permit advance of the plunger, during which movement the elongated closure maintains the outlet substantially closed and upon further movement of the plunger the elongated closure leaving the elongated port establishes communication between the intermediate portion and the point to be lubricated, whereby the inlet to the chamber will be successively opened and closed to the intermediate chamber prior to the successive opening and closing of the outlet port during such plunger advance.

ALBERT J. FARMER.